United States Patent [19]

Tiernan, Jr. et al.

[11] Patent Number: 5,167,167
[45] Date of Patent: Dec. 1, 1992

[54] ROTOR TRIM BALANCING

[75] Inventors: Richard J. Tiernan, Jr., Hobe Sound, Fla.; Bruce V. Lyon, Palm Beach Gardens, both of Fla.

[73] Assignee: United Technologies Corporation, Hartford, Conn.

[21] Appl. No.: 793,892

[22] Filed: Nov. 18, 1991

[51] Int. Cl.⁵ .............................................. F16F 15/22
[52] U.S. Cl. .................................. 74/573 R; 74/572; 74/574; 29/894; 73/470
[58] Field of Search ...................... 74/573 R, 572, 574; 29/894; 73/470

[56] References Cited

U.S. PATENT DOCUMENTS

| | | | |
|---|---|---|---|
| 4,003,265 | 1/1977 | Craig et al. | 74/573 R X |
| 4,428,697 | 1/1984 | Ruland | 74/573 R X |
| 4,803,893 | 2/1989 | Bachinski | 74/573 R X |
| 4,848,182 | 7/1989 | Novotny | 74/573 R |
| 4,879,792 | 11/1989 | O'Connor | 74/573 R X |

Primary Examiner—Richard Lorence
Assistant Examiner—Nicholas Whitelaw
Attorney, Agent, or Firm—Russell M. Lipes, Jr.

[57] ABSTRACT

Rotating machinery construction employing one or more split balance rings within a rotating element the circumferential position of a ring being adjustable through associated casing structure without disassembly of the machinery to permit rebalancing or trim balancing of the rotor element.

5 Claims, 2 Drawing Sheets

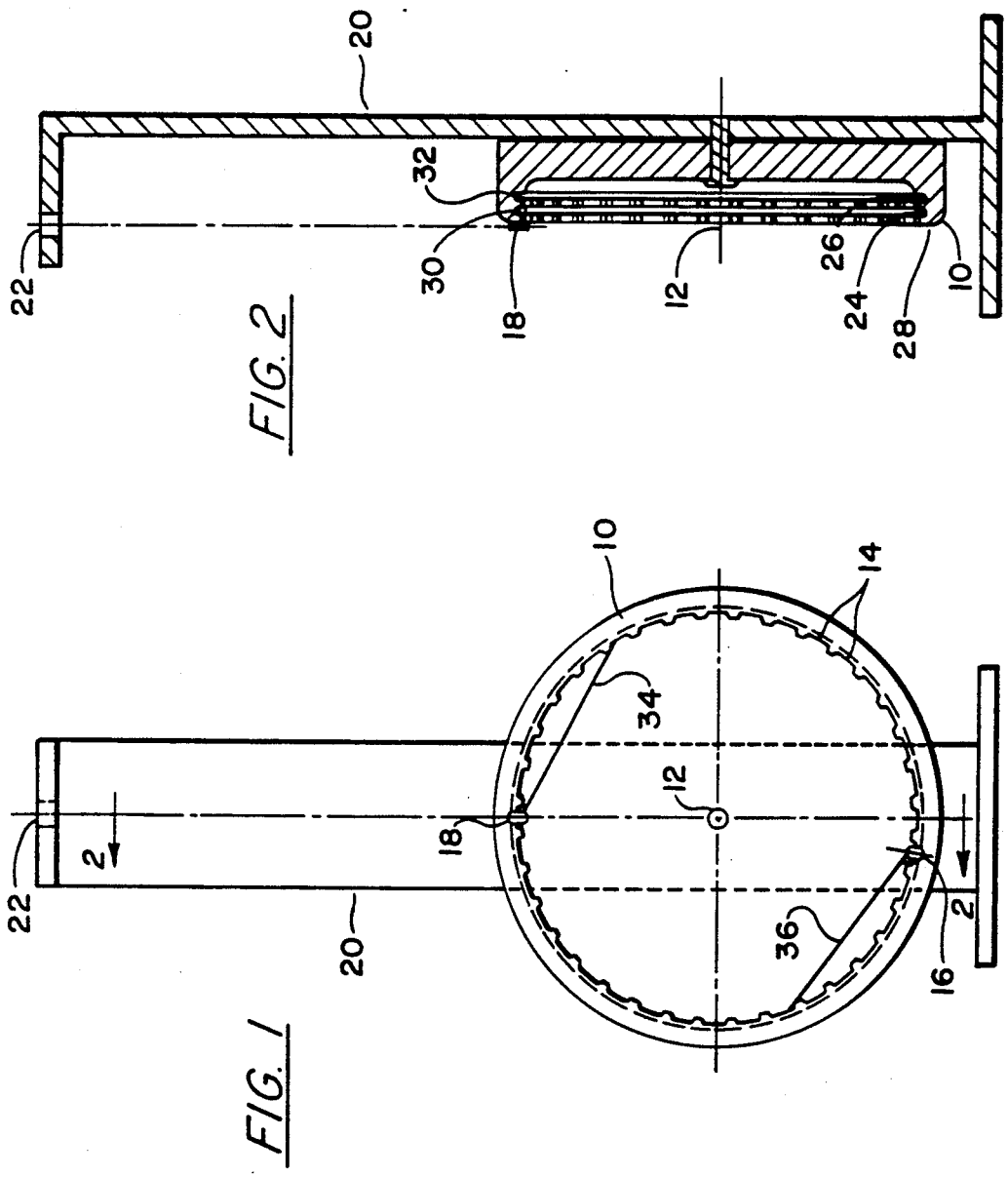

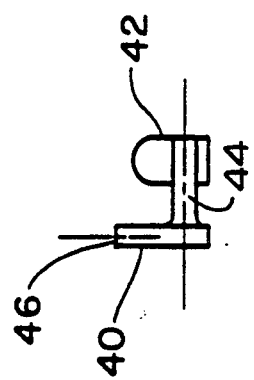
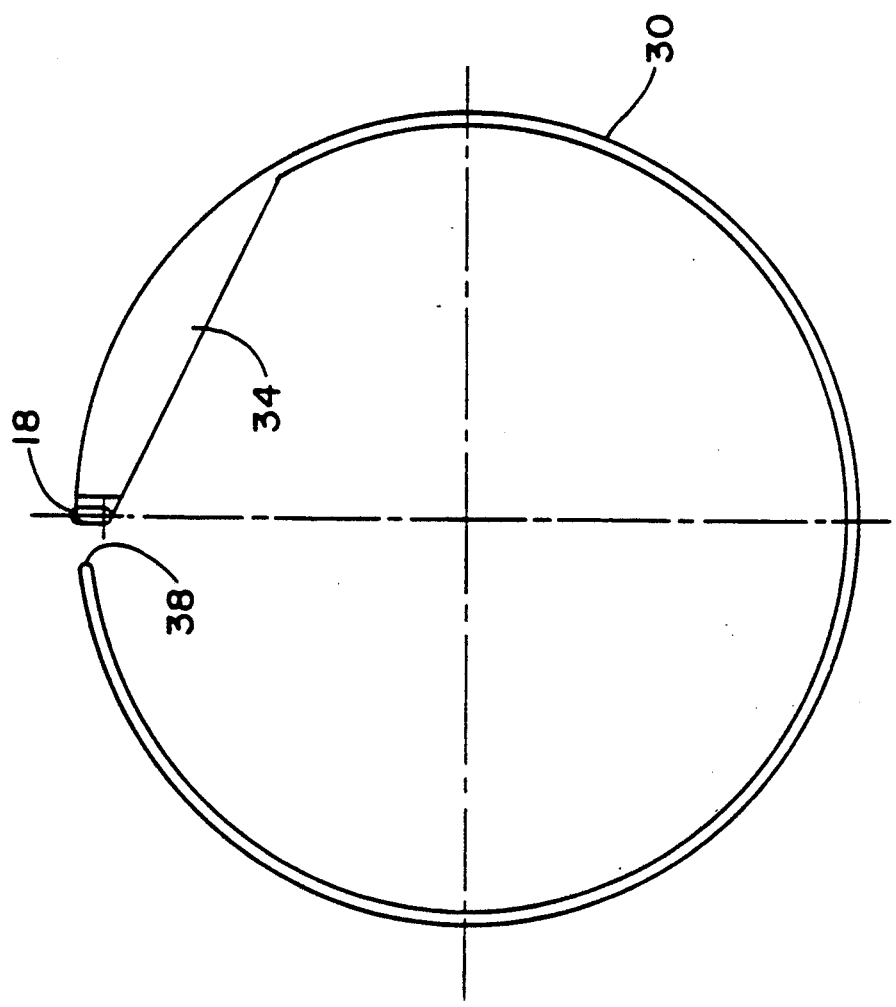

ROTOR TRIM BALANCING

This invention was made with Government support under a contract awarded by the Air Force. The Government has certain rights in the invention.

TECHNICAL FIELD

This invention relates to rotating machinery such as that in gas turbine engines and particularly to the trim balance of such machinery from outside the outer structure of the machinery.

BACKGROUND ART

In rotating machinery, it sometimes becomes necessary to trim the balance of one of the rotor elements after the machinery has been initially balanced for assembly and has been operating in service. Typically, the machinery must be disassembled, completely or partially, to permit rebalancing or trim balancing of the offending rotor element. With aircraft gas turbine engines, it is desirable to be able to quickly and easily trim balance the compressor rotor after an airfoil has suffered foreign object damage and the damaged blade or blades have been blended in without removal of the engine from an aircraft.

U.S. Pat. Nos. 4,803,893, 4,848,182 and 4,879,792 relate to the use of balance weights at selected locations to balance the rotor of a gas turbine engine.

DISCLOSURE OF INVENTION

An object of the invention is a gas turbine engine construction which permits trim balance of the compressor rotor without disassembly of the engine.

Another object of the invention is a gas turbine engine construction which permits the use of borescope holes to achieve trim balance of the compressor rotor after the occurrence of foreign object damage to a rotor blade without major disassembly of the engine.

The foregoing and other objects, features and advantages will be apparent from the following specification and claims and from the accompanying drawings which illustrate an embodiment of the invention.

BRIEF DESCRIPTION OF THE DRAWINGS

FIG. 1 view of a compressor rotor element having balance locating slots around its inner circumference and two balance rings installed in annular grooves behind the element face, the rotor being mounted in a structure representing a gas turbine engine casing.

FIG. 2 is a side view of the showing of FIG. 1.

FIG. 3 is a view of a balance ring.

FIG. 4 is an enlarged view of a balance ring tab.

BEST MODE FOR CARRYING OUT THE INVENTION

In the showing of FIG. 1, annular rotor element 10 having an axis 12 has a series of locating slots 14 about its inner circumference. Tabs 16 and 18, for two annular balance rings positioned in annular grooves behind the face of rotor element 10, can be seen in two of the locating slots. The rotor is mounted on structure 20 representing a gas turbine engine casing. Borescope hole 22 is at the top of structure 20.

As can be seen in FIG. 2, rotor element 10 has inner circumferential grooves 24 and 26 immediately behind face 28. Each of the grooves contains a balance ring, ring 30 in groove 24 and ring 32 in groove 26. Tab 18 is mounted on the end of weighted end 34 (FIG. 1) of balance ring 30 and, as can be seen in FIG. 2, the tab is located in front of rotor element face 28 in a plane in vertical alignment with the axis of borescope hole 22. Similarly, tab 16 is mounted on the end of weighted end 36 (FIG. 1) of balance ring 32 and it also is located in front of rotor element face 28 so as to be in the plane in vertical alignment with borescope hole 22.

Balance ring 30 is shown in FIG. 3. The ring is essentially a full circle, being split adjacent to tab 18 with end 38 being slightly spaced from the tab and weighted end of the ring. The ring is split so as to permit compression thereof for installation within inner groove 24 and for rotary adjustment with respect to the rotor element. Similarly, ring 32 is split adjacent to its weighted end to permit installation within inner groove 26.

FIG. 4 is an enlarged showing of a tab connection to a balance ring. Tab 40 is connected to balance ring 42 by pin 44. The length of the pin depends upon whether the balance ring is in the first or second inner circumferential groove behind the face of the rotor element. The upper surface of the tab may have contoured or flattened area, 46, on which identifying marks such as numerals or letters may be placed. These markings will be visible through the borescope hole when the split ring to which the tab is connected has been rotated so that the tab is in its uppermost vertical position. Tab 18 on balance ring 30 can be seen in that position in FIGS. 1 and 2.

When a balance adjustment needs to be made, rotor element 10 is rotated so that a tab is visible through borescope hole 22. A suitable tool is then inserted through the borescope hole and positioned over the tab. The end of the tool is suitably contoured to mate with the upper surface of the tab. The tool then is used to deflect the tab inward, freeing the tab pin from the locating slot in which it had been positioned. A stop on the tool used to deflect the tab inward controls the deflection of the tab so as to not overload the tab and ring. The rotor element is then rotated in the direction which closes the balance ring. When the desired new circumferential position of the balance ring with respect to the rotor element has been reached, the tool is retracted and the tab pin assumes a position in the new locating slot. Both balance rings are positioned in the same way.

It should be understood that the invention is not limited to the particular embodiment shown and described herein, but that various changes may be made without departing from the spirit or scope of this concept as defined by the following claims.

We claim:

1. A construction for trim balancing a rotating piece of machinery, said machinery including an annular rotor element having an outer face and an inner circumference, locating slots around the inner circumference of said rotor element, at least one annular groove within said rotor element behind said rotor element face, balance ring means in said at lest one annular groove, said balance ring being split and having a weighted mass at one end thereof and tab means connected by pin means to said balance ring at said weighted mass end, said pin means extending through said rotor element locating slots and said tab means being mounted on said pin means so as to be external of said rotor element, said machinery also including casing structure means associated with said rotor element, said casing structure means having an opening therein through which tool means may be inserted to contact said tab means and deflect said tab pin means inward a controlled distance to free said tab pin means from the locating slots and permit a circumferential relocating of said balance ring means.

2. Rotating machinery construction in accordance with claim 1 in which the annular rotor element has two adjacent annular grooves with balance ring means in each groove.

3. Rotating machinery construction in accordance with claim 1 in which the tab means is located in front of said rotor element in a plane in vertical alignment with the casing structure means opening.

4. A construction for trim balancing a rotating piece of machinery, said machinery including an annular rotor element having an outer face and an inner circumference, a series of locating slots about the inner circumference of said rotor element, two annular grooves within said rotor element behind said rotor element face, balance ring means in each of said two annular grooves, beach balance ring being split and having a weighted mass at one end thereof and tab means connected by pin means to the balance ring at said weighted mass end, said pin means extending through said rotor element locating slots and said tab means being mounted on said pin means so as to be external of said rotor element, said machinery also including casing structure means associated with said rotor element, said casing structure means having an opening therein through which tool means may be inserted to contact said tab means and deflect said tab pin means inward a controlled distance to release said tab pin means from the locating slots and permit a circumferential relocating of said balance ring means, said tab means having a surface contoured for contact by said tool means.

5. Rotating machinery construction in accordance with claim 4 in which identifying marks are placed on said tab means.

* * * * *